United States Patent Office 3,442,288
Patented May 6, 1969

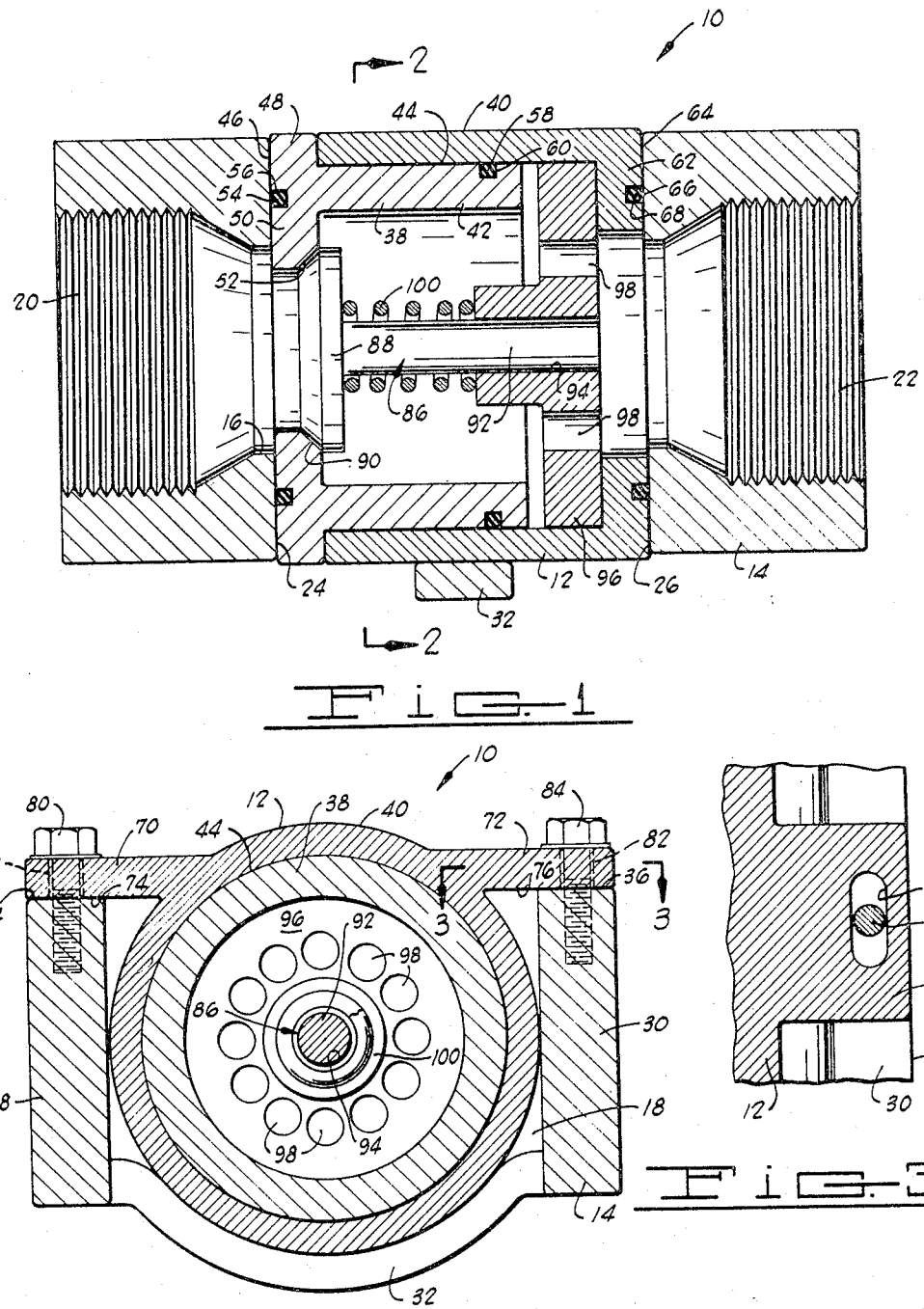

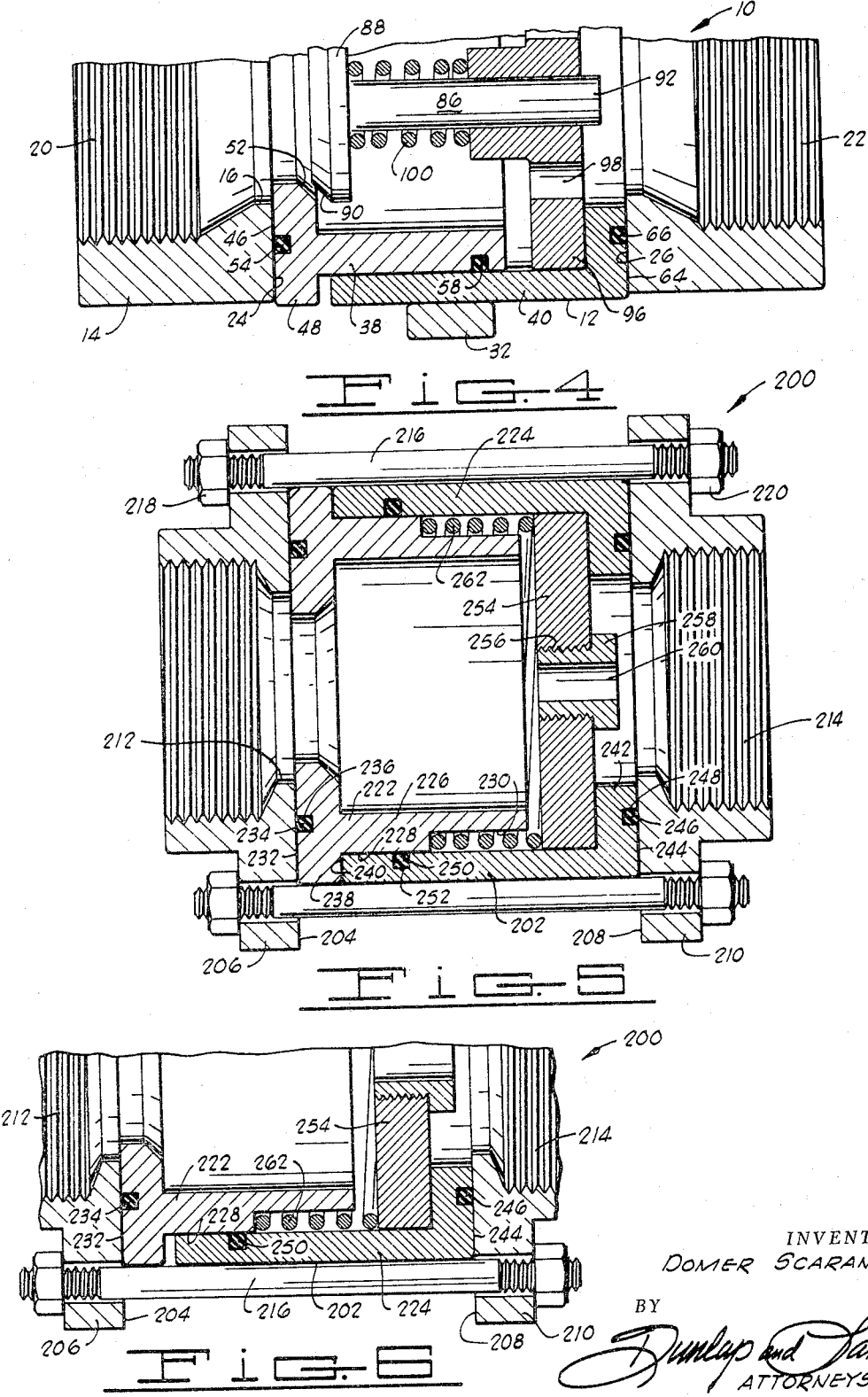

1

3,442,288
FLOW CONTROL APPARATUS MOUNTED
IN A COUPLING
Domer Scaramucci, 3245 S. Hattie,
Oklahoma City, Okla. 73129
Filed Apr. 4, 1966, Ser. No. 540,031
Int. Cl. F16k 15/00, 27/00; F16l 29/00
U.S. Cl. 137—515                              6 Claims

ABSTRACT OF THE DISCLOSURE

Flow control apparatus for use between two opposed surfaces, said apparatus having an inner body slidingly disposed in an outer body to permit telescopic expansion, with seal means so located that the internal pressure contributes to the sealing engagement and having control means located in said body means to control the flow of fluid.

---

This invention relates generally to improved flow control apparatus. More particularly, but not by way of limitation, this invention relates to an improved flow control device having a telescoping body construction and seals therefor.

One of the difficulties in the past in attempting to manufacture various valve or flow control apparatus for use between flanged connecting members or for use in valve housings permanently located in the fluid circuit has been the tendency for the flanged connection members to separate under the influence of fluid pressure in the circuit or for the valve housing to elongate as a result of such internal pressure. When elongation of the housing or separation of the flanged connection members occurs, the normal result is leakage of fluid from the valve between and valve body and housing or between the valve body and the flanged connection members. Naturally, such leakage in many instances renders the valve unserviceable.

In an effort to overcome the elongation of the housing, the usual procedure has been to increase the wall thickness of the valve housing which results in a heavier and more expensive valve. In an effort to preclude separation of flanged connection members, the usual practice has been to provide larger diameter threaded fasteners interconnecting the flanges to hold the valve assembled. The use of large fasteners requires the use of larger and heavier flanged connection members. Manifestly, such procedure has also resulted in a heavier and more expensive valve.

This invention provides improved flow control apparatus for use between a pair of opposed surfaces including: a generally tubular outer body member having an end face arranged to sealingly engage one of the opposed surfaces; a generally tubular inner body member having a portion slidingly disposed in the outer body member and having an end face arranged to sealingly engage the other opposed surface; and, seal means carried by one of the body members in sliding and sealing engagement with the other said body member along a circumference having a diameter larger than the diameter of sealing engagement between the end faces and opposed surfaces, whereby the body members are each biased by fluid pressure in the apparatus toward the respective surface with which each of the body members is in engagement.

2

Accordingly, one object of the invention is to provide improved flow control apparatus that effectively eliminates leakage from the apparatus in the event that separation of the opposed surfaces occurs.

Another object of the invention is to provide an improved flow control apparatus for use in a valve housing permanently located in the fluid circuit that effectively eliminates leakage between the body of the apparatus and the housing in the event that elongation of the housing occurs.

A further object of the invention is to provide improved flow control apparatus for use between a pair of flanged connection members that effectively eliminates leakage between the apparatus body and the connection members in the event that separation of the connection members occurs.

Still another object of the invention is to provide improved check valve located in a valve housing, the check valve being arranged to maintain its sealing engagement with the valve housing in the event that elongation of the housing occurs.

Still another object of the invention is to provide improved flow control apparatus that can be easily and economically manufactured.

The foregoing and additional objects and advantages of the invention will become more apparent as the following description is read in conjunction with the accompanying drawings wherein like reference characters denote like parts in all views and wherein:

FIG. 1 is a vertical cross-sectional view of a check valve constructed in accordance with the invention;

FIG. 2 is a transverse cross-sectional view taken substantially along the line 2—2 of FIG. 1;

FIG. 3 is a fragmentary, horizontal cross-sectional view of a portion of the check valve of FIG. 1 taken substantially along the line 3—3 of FIG. 2;

FIG. 4 is a fragmentary, cross-sectional view illustrating the components of the check valve of FIG. 1 in the position they occupy when elongation of the valve housing occurs and with the valve member in the open position;

FIG. 5 is a vertical cross-sectional view of flow control apparatus located between flanged connection members and also constructed in accordance with the invention; and, FIG. 6 is a fragmentary cross-sectional view of a portion of the apparatus of FIG. 5 illustrating the various components thereof when separation of the flanged connection members occurs.

Embodiment of FIG. 1

Referring to the drawings, and to FIG. 1 in particular shown therein and generally designated by the reference character 10 is a check valve constructed in accordance with the invention. As illustrated, the check valve 10 includes a valve body 12 located in a valve housing 14.

The valve housing 14 includes an opening 16 that extends therethrough and a cavity 18 (see FIG. 2) intersecting the opening 16 and sized to receive the valve body 12. A partially threaded upstream end 20 of the opening 16 is arranged to receive one end of a section of conduit (not shown). A partially threaded downstream end 22 of the opening 16 is also partially threaded to receive an end of a section of conduit (not shown). The ends of the cavity 18 are formed by a pair of opposed surfaces 24 and 26 on the valve housing 14.

As shown more clearly in FIG. 2, the valve housing 16 also includes an elongated side portion 28, a second elongated side portion 30 disposed in generally parallel relationship to the side portion 28 and defining the sides of the cavity 18, and a supporting strap 32 that extends between the side portions 28 and 30. As clearly illustrated in FIG. 2, the strap 32 is arcuate in configuration for receiving the valve body 12. The side portions 28 and 30 are provided with upwardly facing, generally planar surfaces 34 and 36 for purposes that will become more apparent hereinafter.

As illustrated most clearly in FIG. 1, the valve body 12 includes a generally tubular inner body member 38 slidingly disposed within a generally tubular outer body member 40. The inner body member 38 includes an axial flange portion 42 having an outer periphery 44 sized to slidingly fit within the outer body member 40, an end face 46 disposed in engagement with the surface 24 on the valve housing 14, an outwardly extending flange portion 48 that is disposed between the outer body member 40 and the surface 24 on the valve housing 14, and an inwardly extending flange portion 50 having an annular valve seating surface 52 thereon.

An O-ring seal 54 is disposed in an annular groove 56 formed in the end face 46 of the inner body member 38. The O-ring seal 54 is in sealing engagement with the surface 24 on the valve housing 14.

An O-ring seal 58 is disposed in an annular groove 60 formed in the axial flange portion 42 of the inner body member 38 adjacent the periphery 44 thereon. The O-ring seal 58 is in sliding and sealing engagement with the outer body member 40 and has a diameter smaller than the diameter of the seal 54. Thus, the seals 54 and 58 define a differential area on the inner body member 38 that is subject to fluid pressure in the valve 10.

The outer body member 40 includes an inwardly extending flange portion 62 providing an end face 64 on the outer body member 40 that is in engagement with the surface 26 on the valve housing 14. An O-ring seal 66 is disposed in an annular groove 68 formed in the end face 64. The O-ring seal 66 is in sealing engagement with the surface 26 on the valve housing 14 along a circumference having a diameter larger than the diameter of the diameter of the seal 58. Thus, the seals 58 and 66 define a differential area on the outer body member 40 that is subject to fluid pressure in the valve 10.

As shown in FIG. 2, the outer body member 40 also includes a pair of outwardly and oppositely projecting tab portions 70 and 72. The tab portions 70 and 72 are arranged so that the lower surfaces 74 and 76 thereon are disposed in engagement with the upwardly facing surfaces 34 and 36 on the valve housing 14 to align the valve body 12 with the opening 16 extending through the valve housing 14.

The tab portion 70 is provided with a slot 78 (shown in dashed lines) that extends therethrough. The slot 78 is sized to receive a threaded fastener 80.

Similarly, the tab portion 72 is provided with a slot 82 (shown in dash lines) that extends therethrough and is sized to receive a threaded fastener 84. The fasteners 80 and 84 extend into threaded engagement with the side portions 28 and 30, respectively, on the valve housing 14 to hold the valve body 12 assembled with the valve housing 14.

As shown in FIG. 3, the slot 82 is elongated in the direction of the elongation of the side portion 30 to permit relative movement between the valve body 12 and the valve housing 14 in the event that elongation of the valve housing 14 occurs. Although the tab portion 70 is not illustrated in FIG. 3, it will be understood that the relationship of the slot 78, the fastener 80, the tab portion 70 and side portion 28 are the same as illustrated with respect to the tab portion 72.

Referring again to FIG. 1, it can be seen therein that the check valve 10 also includes a check valve member 86 having a head portion 88 that is provided with a beveled surface 90. The surface 90 is arranged to sealingly engage the valve seating surface 52 on the inner body member 38. The valve member 86 also includes a stem portion 92 that extends through aperture 94 that is centrally located in a spider member 96.

The spider member 96 may be of any desired configuration but as illustrated includes a disc-like body having the centrally located aperture 94 therein and also including a plurality of flow apertures 98 that permit flow through the valve 10 when the valve member 86 is in the open position as will be described in connection with FIG. 4. The spider member 96 is disposed in the outer body member 40 in engagement with the flange 62 thereon.

A spring 100 encircles the valve stem portion 92 and has one end in engagement with the head portion 88 and the other end in engagement with the spider member 96. The spring 100 is arranged to constantly bias the valve member toward a position wherein the surface 90 thereon is in sealing engagement with the valve seating surface 52, that is, into a closed position of the check valve 10.

*Operation of the embodiment of FIG. 1*

With the check valve 10 in the closed position as illustrated in FIG. 1, that is, with the surface 90 on the valve member 86 in engagement with the valve seating surface 52 on the inner body member 38, fluid is prevented from flowing through the passageway 16 between the downstream end 22 thereof and the upstream end 20 thereof. Thus, it can be appreciated from viewing FIG. 1 that the interior of the inner body member 38 and the interior of the outer body member 40 are exposed to the effects of fluid pressure therein.

Due to the previously described relationship between the O-ring seals 54, 58 and 66, the fluid pressure in the valve body 12 biases the inner body member 38 relatively toward the surface 24 on the housing 14 maintaining the O-ring seal 54 in sealing engagement with the surface 24. Also, the fluid pressure in the valve body 12 biases the outer body member 40 relatively toward the surface 26 on the valve housing 14 maintaining the O-ring seal 66 carried thereby in sealing engagement with the surface 26.

When the fluid pressure increases to a sufficiently high magnitude, the housing 14 elongates, moving the surfaces 24 and 26 on the valve housing 14 relatively apart as illustrated in FIG. 4. When this occurs, the O-ring seal 54 carried by the inner body member 38 is maintained in sealing engagement with the surface 24 due to the force generated by the fluid pressure in the valve body 12. Also, the O-ring seal 66 carried by the outer body member 40 is maintained in sealing engagement with the surface 26 since the outer body member 40 is biased by the fluid pressure in the valve body 12 toward the surface 26 on the valve housing 14.

When the fluid pressure in the upstream end 20 of the check valve 10 increases to a value above the pressure in the downstream end 22, the valve member 22 is moved relatively toward the downstream end 22 separating the surface 90 on the valve member 86 from the valve seating surface 52 on the inner body member 38. When in this position, as illustrated in FIG. 4, fluid flows through the check valve 10 from the upstream end 20 of the opening 16 to the downstream end 22 thereof.

When the magnitude of the fluid pressure in the valve 10 becomes sufficiently high, the valve housing 14 elongates, moving the surfaces 24 and 26 thereon relatively apart as previously described. When this occurs, all the components of the check valve 10 are in the position illustrated in FIG. 4.

With the valve housing 14 elongated, no fluid can escape between the valve body 12 and the valve housing 14 since the inner body member 38 is biased relatively toward the surface 24 by fluid pressure which maintains the O-ring seal 54 thereon in sealing engagement with the surface 24. Also, the outer body member 40 is moved by fluid pressure in the valve 10 toward the surface 26 on the valve housing 14, maintaining the O-ring seal 66 in sealing engagement with the surface 26 thereby preventing leakage between the valve body 12 and the surface 26 of the housing 14.

It should also be pointed out that in either operating position of the valve member 86, no fluid can escape from the valve body 12 between the inner body member 38 and the outer body member 40 due to the seal formed by the engagement of the O-ring seal 58 with both the body members 38 and 40. Thus, the valve 10, when constructed as described, is effective to prevent leakage of fluid from the valve body 12 and from between the valve body 12 and the valve housing 14 regardless of the position of the valve operating member 86 and even though elongation of the valve housing 14 has occurred. In view of this, it is possible to reduce the overall weight and, consequently, the cost of the valve 10, thereby permitting the manufacture of the valve at a competitive cost.

Embodiment of FIG. 5

FIG. 5 illustrates an embodiment of flow control apparatus generally designated by the reference character 200 and also constructed in accordance with the invention. As shown therein, the apparatus 200 includes a body 202 disposed between an end face 204 on an upstream flanged connection member 206 and an end face 208 on a downstream flanged connection member 210.

The upstream flanged connection member 206 also includes a partially threaded opening 212 that extends therethrough intersecting the end face 204. Similarly, the downstream flanged connection member 210 includes a partially threaded opening 214 that extends therethrough intersecting the end face 208.

As clearly shown in FIG. 5, a plurality of fasteners 216 extend through the flanged connection members 206 and 210. Each end of the fasteners 216 is threaded to receive a threaded nut 218 that is in engagement with the upstream flanged connection member 206 and a threaded nut 220 that is in engagement with the downstream flanged connection member 210. The threaded fasteners 216 serve to hold the body 202 assembled with the flanged connection members 206 and 210 and to hold the body 202 in alignment with the openings 212 and 214 that extend through the flanged connection members 206 and 210, respectively.

The body 202 includes a generally tubular inner body member 222 that is slidingly disposed in a generally tubular outer body 224. The inner body member 222 includes an axial flange portion 226 having an outer periphery 228 sized to slidingly fit within the outer body member 202. An annular recess 230 is formed on the outer periphery 228 of the inner body member 222 for purposes which will appear more fully hereinafter.

The inner body member 222 also includes an end face 232 that is in engagement with the end face 204 on the upstream flanged connection member 206. An O-ring seal 234 is disposed in an annular recess 236 formed in the end face 232. The O-ring seal 234 is in sealing engagement with the end face 204 of the flanged connection member 206. It will also be noted that the O-ring seal 234 has an outside diameter smaller than the outer periphery 228 of the axial flange portion 226 of the inner body member 222.

The inner body member 222 also includes a radially extending flange portion 238. The flange portion 238 is disposed between the end face 204 of the upstream flanged connection member 206 and an upstream end face 240 on the outer body member 224.

The outer body member 224 also includes an inwardly projecting annular flange portion 242 that forms a downstream end face 224 thereon. An O-ring seal 246 is disposed in an annular groove 248 formed in the end face 244. The O-ring seal 246 is in sealing engagement with the end face 208 on the downstream flanged connection member 210. The outer diameter of the O-ring seal 246 is smaller than the diameter of the outer periphery 228 of the inner body member 222 for purposes that will appear more fully hereinafter.

An O-ring seal 250 is disposed in an annular recess 252 formed in the outer body member 224. The O-ring seal 250 is in sliding and sealing engagement with the outer periphery 228 of the inner body member 222. The inner body member 222 and the outer body member 224 each have a differential area thereon defined by the seals 234, 246 and 250 since the O-ring seal 250 has a diameter larger than the diameters of the O-ring seals 234 and 246. Thus, fluid pressure within the body 202 exerts a force on the differential areas of the inner body member 222 and the outer body member 224, forcing them relatively apart, that is, relatively toward the end faces 204 and 208 on the upstream and downstream flange connection members 206 and 210, respectively. Manifestly, the only opposing force generated on the inner body member 222 by the fluid pressure is the small annular area between the opening 212 and the O-ring seal 234. The only opposing force generated on the outer body member 224 is on the small annular area between the opening 214 and the O-ring seal 246.

The apparatus 200 also includes an orifice plate 254 that is disposed within the outer body member 224 in engagement with the flange portion 242 thereon. The orifice plate 254 includes a threaded aperture 256 extending therethrough for receiving a threaded orifice member 258. The orifice member 258 has an orifice 260 extending therethrough for purposes which will be understood by those skilled in the art.

The apparatus 200 also includes a compression spring 262 that is disposed in the annular recess 230 on the inner body member 222. The spring 262 has one end in engagement with the inner body member 222 and the other end in engagement with the orifice plate 254. The arrangement is such that the inner and outer body members 222 and 224, respectively, are constantly biased relatively apart, that is, are biased in a direction wherein the end faces 232 and 234 thereon are maintained in constant engagement with the end face 204 on the upstream flanged connection member 206 and the end face 208 on the downstream connection member 210.

Operation of the embodiment of FIG. 5

With the apparatus 200 assembled as illustrated in FIG. 5, it can be appreciated that the various components thereon remain in the position illustrated until the force exerted by fluid pressure therein is sufficient to elongate the fasteners 216. When this occurs, the flanged connection members 206 and 210 move relatively apart as illustrated in FIG. 6.

As shown therein, the fasteners 216 have elongated permitting the relative movement of the end faces 204 and 208 on the connection members 206 and 210 until they are a greater distance apart than the original assembled length of the body 204 as shown in FIG. 5. As elongation of the fasteners 216 occurs, fluid pressure in the apparatus 200 exerts a force on the inner body member 222, as previously described, to maintain the end face 232 thereon in engagement with the end face 204 of the upstream flanged connection member 206 and thereby maintaining the O-ring seal 234 in sealing engagement therewith. Similarly, the outer body member 224 is biased by fluid pressure in the body 202 toward the downstream flanged connection member 210. The fluid pressure maintains the end face 244 of the outer body member 224 in engagement with the end face 204 on the downstream flanged connection member 210 and thereby maintains the O-ring seal 246 in sealing engagement with the end face 208. The compression spring 262, which initiates the sealing engagement between the seals 234 and 246 with the respective end faces 204 and 208, also aids in maintaining the sealing engagement between the seals 234 and 246 with the end faces 204 and 208, respectively, since it tends to bias the inner body member 222 and the outer body member 224 relatively apart.

Thus, it can be appreciated that apparatus 200, constructed as described hereinbefore, effectively prevents the escape of fluid from between the body 202 and the flanged connection members 206 and 210 due to the sealing engagement between the O-ring seals 234 and 246 and the end faces 204 and 208, respectively. Also, fluid cannot escape from the body 202 between the inner and outer body members 222 and 224, respectively, due to the sealing engagement of the O-ring seal 250 with the outer periphery 228 of the inner body member 222.

With respect to the embodiments of FIG. 1 and FIG. 5, it should be pointed out that the check valve member 86 may be utilized between flanged connection members in lieu of the orifice 254 if desired or the orifice plate 254 may be utilized in the housing 14 as described in connection with the embodiment of FIG. 1 in lieu of the check valve member 86. Also, there are various flow control devices suitable, though not described, that may effectively utilize the body construction described hereinbefore.

It will be appreciated that the embodiments described are presented by way of example only and that many changes and modifications can be made thereto without departing from the spirit of the invention.

What I claim is:

1. A flow control apparatus for use between a pair of opposed planer surfaces having aligned openings therethrough, comprising:
    a generally tubular outer body member having a flanged end facing one of said planar surfaces;
    a first annular seal member carried by the flanged end of the outer body member sealingly engaging the adjacent planar surface around the respective opening;
    a generally tubular inner body member having a portion slidingly disposed in said outer body member and having a flanged end face facing the other of the opposed planar surfaces;
    a second annular seal member carried by the flanged end of the inner body member sealingly engaging the adjacent planar surface around the respective opening;
    flow control means carried by one of said body members for controlling the flow of fluid through the apparatus;
    seal means carried by one of said body members in sliding and sealing engagement with the other body member along a circumference having a diameter larger than the diameter of sealing engagement between said first and second annular seal members and said opposed planar surfaces, whereby said body members are each biased by fluid pressure in said apparatus toward the respective planar surface; and
    housing means at least partially surrounding said body members connected to said planar surfaces and engaging at least one of said body members holding said body members in alignment with said openings, said housing means being capable of disassembly for removal of said body means without further separation of said planar surfaces.

2. The apparatus of claim 1 wherein said control means includes an orifice plate having an orifice extending therethrough, said orifice plate being located in said outer body member relatively near the end face thereon.

3. The apparatus of claim 1 wherein said control means includes:
    a spider member located in said outer body member and having a centrally located aperture extending therethrough;
    an annular valve seat on said inner body member;
    a valve member having a stem portion extending through said aperture and a head portion engageable with said valve seat, said valve member being movable toward and away from said valve seat to control fluid flow through said apparatus; and,
    resilient means engaging said valve member and spider member biasing said valve member toward said valve seat.

4. A check valve for use between sections of a conduit comprising:
    a valve housing having an opening extending therethrough, a cavity intersecting said opening forming a pair of opposed surfaces, each end of said opening being arranged for connection with the conduit, and side portions extending along each side of said cavity, each side portion having a generally planar surface;
    a valve body disposed in said cavity and a passageway extending therethrough, said body including
        a tubular outer member having an end face engaging one of said opposed surfaces and carrying a first annular seal member sealingly engaging one of said opposed surfaces, and having a pair of tab portions thereon overlying said generally planar surfaces,
        a tubular inner member partially disposed in said outer member and in sliding engagement therewith, said inner member having an end face engaging the other said opposed surface and carrying a second annular seal member sealingly engaging said other opposed surface and a third annular seal member that is in sliding and sealing engagement with said outer member, said third annular seal member having a larger diameter of sealing engagement than said first and second annular seal members, whereby said inner and outer members are biased by fluid pressure in said body toward a respective one of said opposed surfaces;
    a spider member located in said outer member and having a centrally located aperture extending therethrough;
    an annular valve seat formed on said inner member encircling said passageway;
    a valve member including a stem portion extending through said aperture and a head portion sized to engage said valve seat, said valve member being moable toward and away from said valve seat to close and open said valve;
    spring means encircling said stem portion and engaging said spider member and valve member to bias said valve member toward said valve seat; and,
    fastening means extending through said tab portions and engaging said side portions to hold said valve body in said housing.

5. Flow control apparatus for use between sections of conduit or the like, said apparatus including:
    housing means having opposite ends adapted for connection with the conduit, an opening extending therethrough and through said ends, and a cavity intersecting said opening and defining a pair of opposed planar surfaces therein, said housing further having a side portion extending along each side of said cavity having a generally planar surface thereon; and
    body means located in said cavity and including:
        a generally tubular outer body member having an end face in engagement with one of said opposed planar surfaces;
        a generally tubular inner body member having a portion slidingly disposed in said outer body member and having an end face in engagement with the other said opposed planar surface;
        seal means carried by one of said body members in sliding and sealing engagement with the other said body member;
        a pair of tab portions overlying said generally planar surfaces of said side portions; and
        fastener means extending through said tab portions and engaging said side portions to hold said body means in said housing.

6. Flow control apparatus as defined in claim 5 characterized further to include annular seals carried by said end faces of said inner and outer body members in positions to engage said opposed planar surfaces along a diameter smaller than the diameter of said seal means.

References Cited

UNITED STATES PATENTS

| | | | |
|---|---|---|---|
| 2,627,580 | 2/1953 | Picard | 285—31 XR |
| 2,673,100 | 3/1954 | Shumaker | 285—31 |
| 2,729,238 | 1/1956 | Hite | 137—515.7 |
| 2,886,062 | 5/1959 | Wheatley | 137—515.5 XR |
| 3,146,792 | 9/1964 | Donnelly | 251—315 XR |
| 3,202,175 | 8/1965 | Dumm | 132—454.2 |

FOREIGN PATENTS 1,001,071  1/1957  Germany.

HAROLD W. WEAKLEY, *Primary Examiner.*

U.S. Cl. X.R.

137—315, 454.2, 543; 285—31, 100